United States Patent
Puff et al.

(10) Patent No.: US 6,832,899 B2
(45) Date of Patent: Dec. 21, 2004

(54) VIBRATION DAMPENING SYSTEM FOR A RECIPROCATING COMPRESSOR WITH A LINEAR MOTOR

(75) Inventors: Rinaldo Puff, Joinville (BR); Dietmar Erich Bernhard Lilie, Joinville (BR)

(73) Assignee: Empresa Brasileira de Compressores S.A. Embraco, Joinville (BR)

(*) Notice: Subject to any disclaimer, the term of this patent is extended or adjusted under 35 U.S.C. 154(b) by 268 days.

(21) Appl. No.: 10/220,080

(22) PCT Filed: Jun. 28, 2001

(86) PCT No.: PCT/BR01/00082
§ 371 (c)(1),
(2), (4) Date: Sep. 25, 2002

(87) PCT Pub. No.: WO02/06698
PCT Pub. Date: Jan. 24, 2002

(65) Prior Publication Data
US 2003/0133812 A1 Jul. 17, 2003

(30) Foreign Application Priority Data
Jul. 17, 2000 (BR) .......................... PI 0003293

(51) Int. Cl.⁷ ................................ F04B 17/04
(52) U.S. Cl. ...................... 417/363; 417/417
(58) Field of Search ................ 417/363, 415, 417/417

(56) References Cited
U.S. PATENT DOCUMENTS 3,788,778 A * 1/1974 Miller .................. 417/417
5,772,410 A * 6/1998 Chang .................. 417/363
6,273,688 B1 * 8/2001 Kawahara et al. .......... 417/417

FOREIGN PATENT DOCUMENTS

| | | |
|---|---|---|
| DE | 139 152 | 12/1979 |
| DE | 41 10 922 | 10/1991 |
| EP | 0 580 272 | 1/1994 |
| FR | 1 180 821 | 6/1959 |
| GB | 1222425 | * 2/1971 |
| JP | 09250456 | 9/1997 |
| JP | 2000234586 | 8/2000 |
| WO | WO 01/29444 | * 4/2001 |

* cited by examiner

*Primary Examiner*—Michael Koczo
(74) *Attorney, Agent, or Firm*—Darby & Darby

(57) ABSTRACT

A vibration dampening system for a reciprocating compressor with a linear motor of the type comprising a motor-compressor assembly having a reference assembly (20) formed by a motor and a cylinder (4) and mounted inside a shell (1) and a resonant assembly (10) formed by a resonant spring (3) and piston (2) reciprocating inside the cylinder (4), the system comprising at least one first balancing means (30) connecting the reference assembly (20) to the shell (1), and at least one second balancing means (40) connecting the resonant assembly (10) to the shell (1), both balancing means (30, 40) actuating according to the displacement direction of the piston (2), said second balancing means (40) presenting a coefficient of elasticity proportional to the coefficient of elasticity of the first balancing means (30) by a factor defined by the ratio of the masses of the resonant assembly (10) and of the reference assembly (20), respectively.

7 Claims, 4 Drawing Sheets

VIBRATION DAMPENING SYSTEM FOR A RECIPROCATING COMPRESSOR WITH A LINEAR MOTOR

FIELD OF THE INVENTION

The present invention refers to a vibration dampening system to be used in a reciprocating compressor driven by a linear motor, in which the fixation of the motor-compressor assembly to the shell is generally made by springs.

BACKGROUND OF THE INVENTION

In a reciprocating compressor with a linear motor (FIG. 1) the compression mechanism of the gas occurs by the axial movement of a piston inside a cylinder. Suction and discharge valves are located in the cylinder head, for controlling the admission and discharge of the gas in relation to the cylinder. The piston is driven by an actuator, which carries a magnetic component actuated by a linear motor. The piston is connected to a resonant spring and forms, jointly with the magnetic component and the spring, the resonant assembly of the compressor.

The compressor is mounted inside a shell onto an assembly of dampening springs (having a coefficient of elasticity KS), whose function is to minimize the transmission of vibration resulting from the movement of the resonant assembly.

The vibrations generated during normal operation of the compressor are produced by oscillation of the mass of the mechanical assembly of the compressor During operation, the resonant assembly, of mass MP, is displaced in relation to the assembly formed by the cylinder and the motor (reference assembly, of mass MR) driven by the motor. By the action-reaction principle, the reference assembly will have a displacement proportional to the ratio of the masses of these two assemblies (FIG. 2). Such displacement of the reference assembly, which is seated on the dampening springs, transmits an alternate force to the shell of the compressor, causing said shell to vibrate, which is undesirable in this kind of machine generally used in the refrigeration systems of household appliances.

SUMMARY OF THE INVENTION

It is a generic objective of the present invention to provide a vibration dampening system for a reciprocating compressor with a linear motor, which allows achieving a considerable attenuation of the vibration resulting from the operation of the compressor.

This objective is achieved by a vibration dampening system for a reciprocating compressor with a linear motor of the type comprising: a shell, a motor-compressor assembly comprising a reference assembly formed by a motor and a cylinder and mounted inside the shell by dampening springs, and a resonant assembly formed by a resonant spring and a piston reciprocating inside the cylinder, said system comprising at least one first balancing means connecting the reference assembly to the shell, and at least one second balancing means connecting the resonant assembly to the shell, both balancing means actuating according to the displacement direction of the piston, said second balancing means presenting a coefficient of elasticity proportional to the coefficient of elasticity of the first balancing means, by a factor defined by the ratio of the masses of the resonant assembly and of the reference assembly, respectively.

BRIEF DESCRIPTION OF THE DRAWINGS

The invention will be described below, with reference to the attached drawings, in which.

DESCRIPTION OF THE ILLUSTRATED EMBODIMENTS

Figure 1:
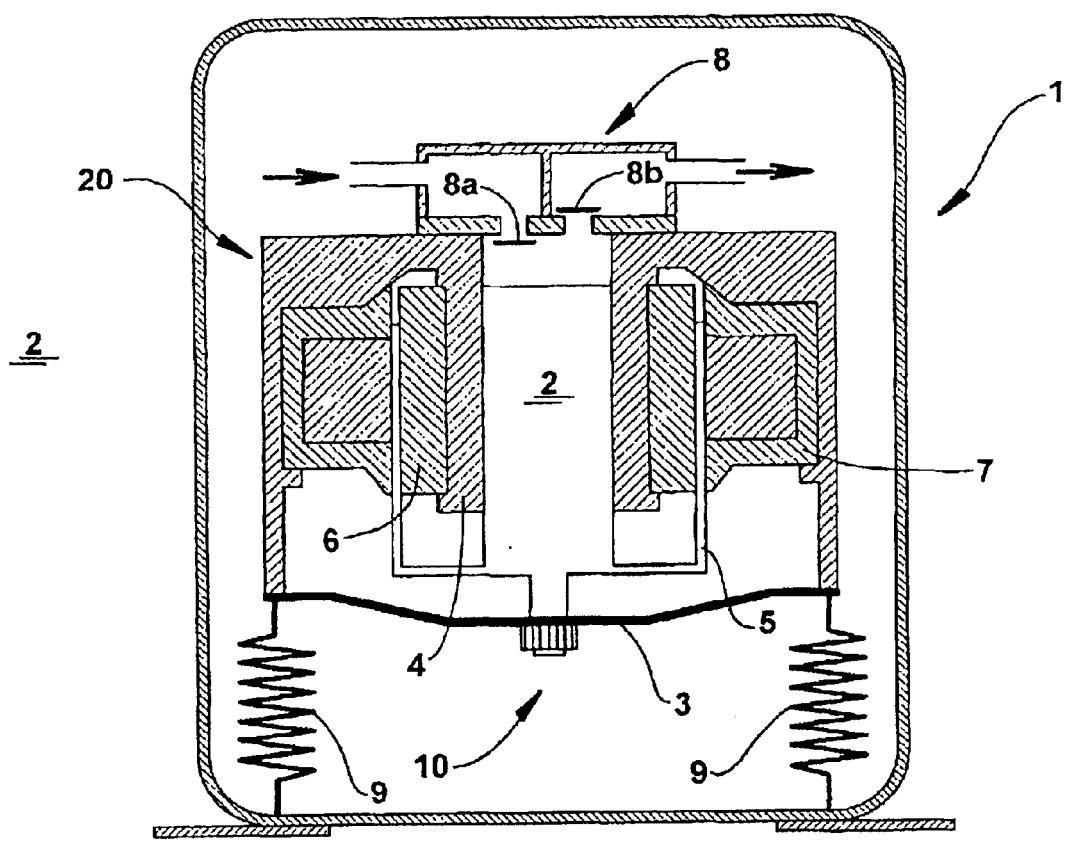
FIG. 1 is a schematic longitudinal sectional view of part of a reciprocating compressor with a linear motor mounted inside a compressor shell by dampening springs, according to the prior art.

The present invention will be described in relation to a reciprocating hermetic compressor with a linear motor comprising, inside a shell 1 and as illustrated, a motor-compressor assembly having a piston 2 connected to a resonant spring 3 and which is axially displaced inside a cylinder 4 by an actuator 5 carrying a magnetic component 6 driven by a linear motor 7. The cylinder 4 has an end opposite to the operative end of the piston 2 and which is closed by a cylinder head 8, in which a suction valve 8a and a discharge valve 8b are positioned for controlling the admission and discharge of the gas in relation to the cylinder 4.

Figure 2:
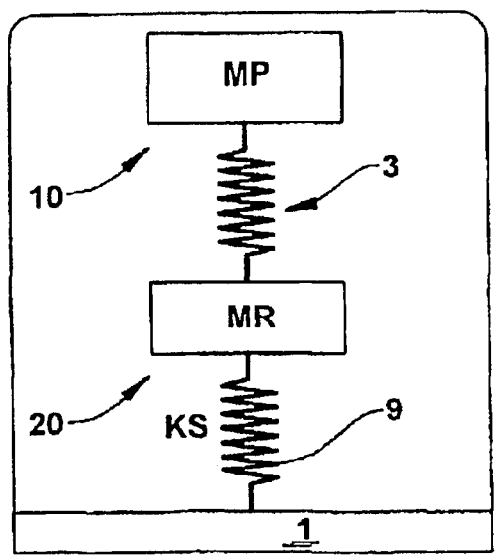
FIG. 2 schematically illustrates the arrangements of the resonant assembly and the reference assembly of the reciprocating compressor with a linear motor of FIG. 1.
Figure 8:
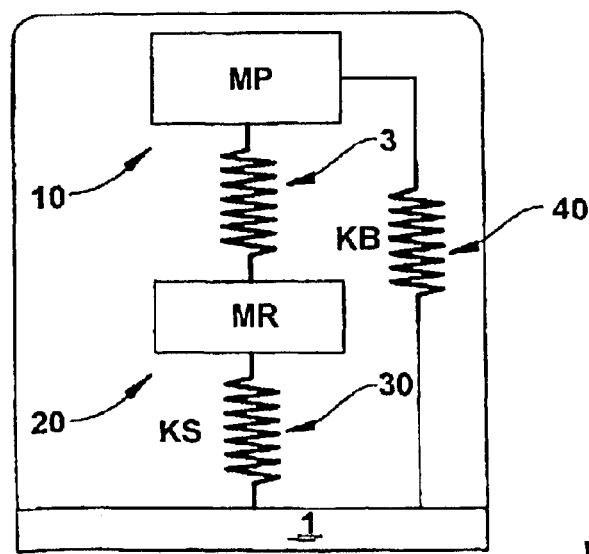
FIG. 8 schematically illustrates the arrangements of both the resonant and the reference assemblies of the reciprocating compressor with a linear motor of FIGS. 3–7.

The piston 2, the resonant spring 3 and the magnetic components form a resonant assembly 10, of mass MP and the assembly formed by the cylinder and the motor defines a reference assembly 20, of mass MR, schematically illustrated in FIGS. 2 and 8. The reference assembly 20 is seated on dampening springs generally defined by helical springs 9, as illustrated in FIGS. 1–2, or by flexible arms with a coefficient of elasticity KS.

In the construction of the prior art (FIGS. 1 and 2), the operation of the compressor causes vibrations of the reference assembly 20, at least in the displacement direction of the piston 2, which are not dampened by the dampening means and which are transmitted to the shell 1, as previously described.

According to the present invention, the reciprocating compressor of the type driven by a linear motor is provided with a vibration dampening system, for minimizing the oscillations resulting from the reciprocating displacement of the piston 2 inside the cylinder 4, comprising at least one first balancing means 30 connecting the reference assembly 20 to the shell 1 and at least one second balancing means 40 connecting the resonant assembly 10 to the shell 1, both balancing means actuating according to the displacement direction of the piston 2 reciprocating inside the cylinder 4, said second balancing means 40 presenting a coefficient of elasticity KB proportional to the coefficient of elasticity KS of the first balancing means 30, by a factor defined by the ratio between the mass MP of the resonant assembly 10 and the mass MR of the reference assembly 20.

Although in the illustrated constructions the balancing means 30, 40 are directly anchored to the shell 1, the present invention foresees other constructive options, in which the balancing means 30, 40 are mounted to the shell 1 through a connecting means, provided that the latter does not change the ratio of masses and coefficients of elasticity between the resonant and reference assemblies 10, 20 and the balancing means 30, 40.

The proposed solution is schematically shown in FIG. 8.

According to the present invention, the first and the second balancing means 30, 40 should be arranged in relation to each other substantially according to the same direction, coinciding with the direction of displacement of the piston 2 inside the cylinder 4.

Figure 3:
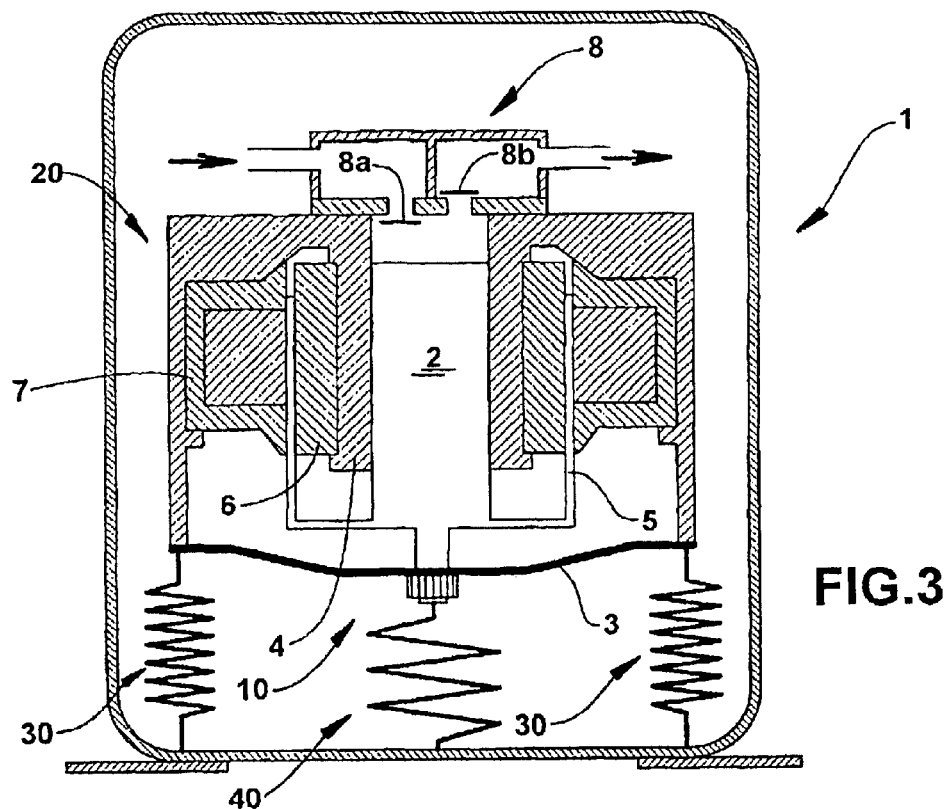
FIG. 3 is a schematic longitudinal sectional view of part of a reciprocating compressor with a linear motor mounted inside a compressor shell by dampening springs and provided with a vibration dampening system constructed according to a first embodiment of the present invention.
Figure 4:
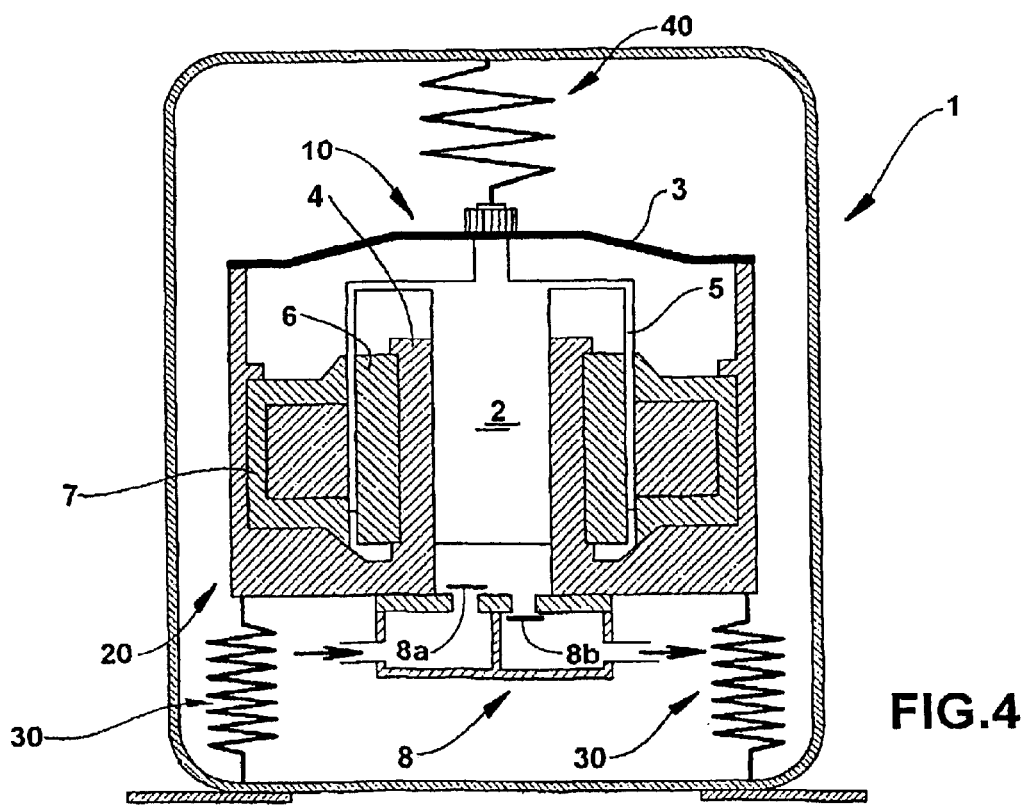
FIG. 4 schematically illustrates, as in FIG. 3, a vibration dampening system constructed according to a second embodiment of the present invention.
Figure 5:
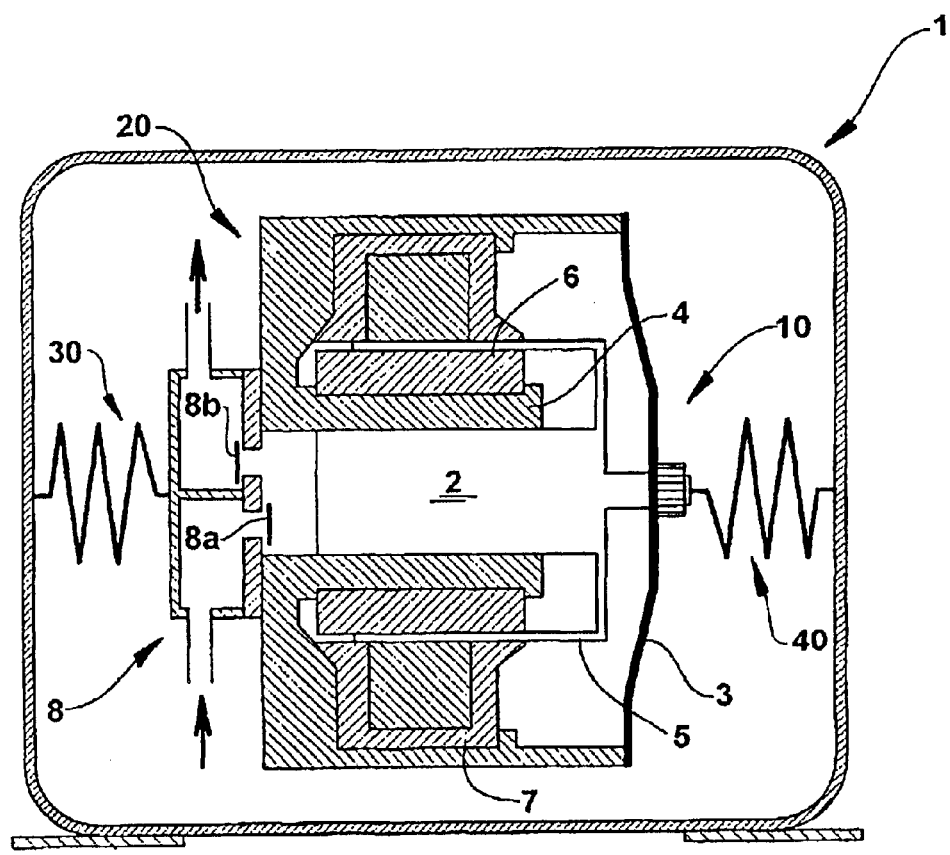
FIG. 5 schematically illustrates a vibration dampening system, constructed according to a third embodiment of the present invention.

According to an embodiment of the present invention, illustrated in FIGS. 3–5, the first balancing means 30 is defined by the dampening springs and the second balancing means 40 is defined by at least one helical spring. In the arrangement illustrated in FIGS. 3 and 4, the second balancing means 40 presents only one helical spring, which is mounted to the resonant assembly 10, so that its longitudinal axis is aligned to the longitudinal axis of the piston 2.

FIG. 3 illustrates a first embodiment of the present invention, in which the helical spring of the second balancing means 40 and the dampening springs that define the first balancing means 30 are provided under the motor-compressor assembly.

FIG. 4 illustrates a second embodiment of the present invention, in which the helical spring of the second balancing means 40 is provided above the motor-compressor assembly and opposite to the dampening springs.

FIG. 5 illustrates a third embodiment of the present invention, in which the first and the second balancing means 30, 40 include two helical springs, which are aligned to each other and to the longitudinal axis of the piston 2, horizontally disposed. In this construction, the first and the second balancing means 30, 40 also operate as dampening means for suspending the compressor inside the shell and they are adequately dimensioned to exert the double "suspending-balancing" function.

Figure 6:
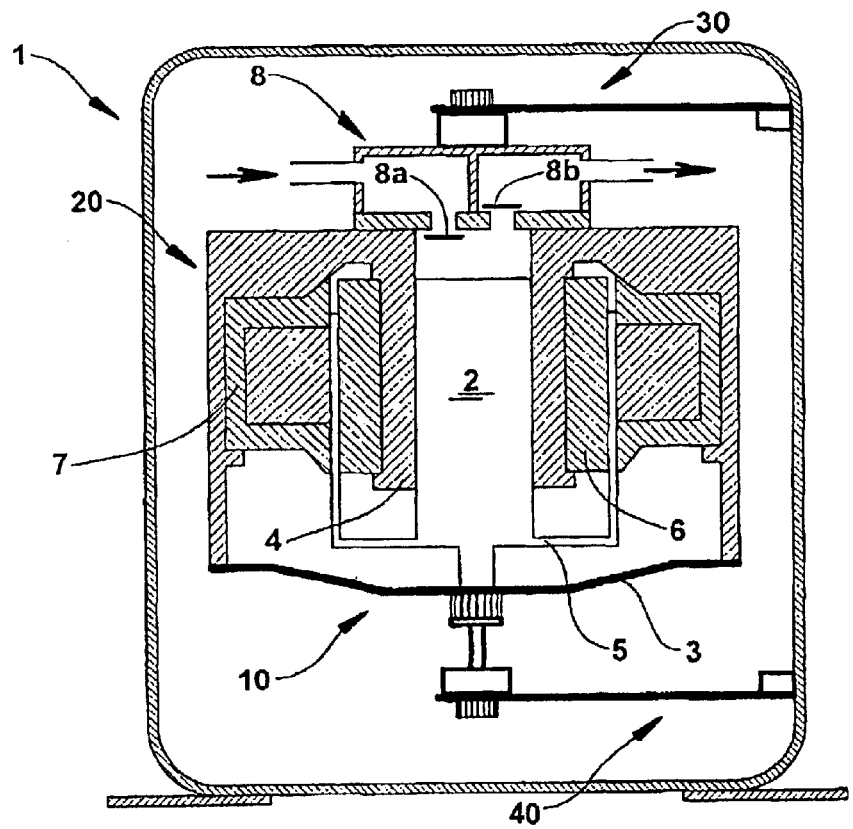
FIG. 6 schematically illustrates, as in FIG. 3, a vibration dampening system constructed according to a fourth embodiment of the present invention.

FIG. 6 illustrates a forth embodiment of the present invention, in which each of the first and second balancing means is formed by a respective flexible arm, which is disposed transversal to the displacement direction of piston 2. In this construction, the flexible arm of the first balancing means 30 is affixed to the shell 1 and to the reference assembly 20, defining a suspending means of the motor-compressor assembly, while the flexible arm of the second balancing means 40 is affixed to the shell 1 and to the resonant assembly 10, in order to actuate in the displacement direction of piston 2.

Figure 7:
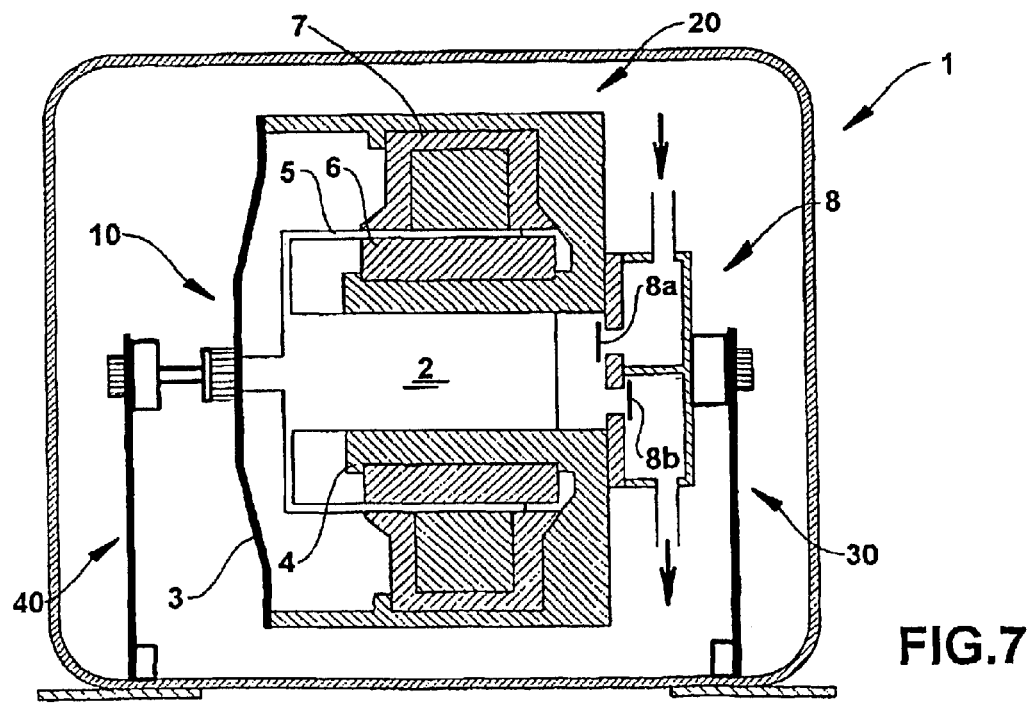
FIG. 7 schematically illustrates, as in FIG. 3, a vibration dampening system constructed according to a fifth embodiment of the present invention.

FIG. 7 illustrates a variation of the present invention, using flexible arms for the first and second balancing means 30, 40 in a transversal arrangement in relation to that illustrated in FIG. 6, as a function of the transversal mounting of the motor-compressor assembly.

Although not illustrated, it should be understood that the present invention foresees that the first and second balancing means may be each formed with at least one of the elements defined by a helical spring and by a flexible arm, which is disposed transversal to the displacement direction of piston 2.

Since the movements of the resonant assembly 10 and the reference assembly 20 occur in phase opposition, when the coefficient of elasticity of the second balancing means is correctly defined, the transmission of forces from the reference assembly 20 and from the resonant assembly 10 to the shell 1 will occur in phase opposition, and with a substantially equal amplitude, resulting in a force on the shell 1 close to or equal to zero, considerably reducing or even eliminating the undesirable vibration on said shell.

FIG. 8 schematically illustrates the resonant assembly 10 and the reference assembly 20 and the balancing means of the present invention, in which balance is achieved by the equation KB=KS(MP/MR), as previously described.

What is claimed is:

1. A vibration dampening system for a reciprocating compressor with a linear motor of the type comprising: a shell (1), a motor-compressor assembly comprising a reference assembly (20) formed by a motor and a cylinder (4) and mounted inside the shell (1) by dampening springs, and a resonant assembly (10) formed by a resonant spring (3) and a piston (2) reciprocating inside the cylinder (4), characterized in that at least one first balancing means (30) connects the reference assembly (20) to the shell (1), and at least one second balancing means (40) connects the resonant assembly (10) to the shell (1), both balancing means (30, 40) actuating according to the displacement direction of the piston (2), said second balancing means (40) presenting a coefficient of elasticity proportional to the coefficient of elasticity of the first balancing means (30) by a factor defined by the ratio of the masses of the resonant assembly (10) and of the reference assembly (20), respectively.

2. System, according to claim 1, characterized in that the first balancing means (30) is parallel to the second balancing means (40).

3. System, according to claim 2, characterized in that the first balancing means (30) is defined by the dampening springs.

4. System, according to claim 1, characterized in that the first and second balancing means (30, 40) are defined by the dampening springs.

5. System, according to claim 4, characterized in that the first and second balancing means (30, 40) are arranged aligned to each other with the displacement direction of the piston (2).

6. System, according to claim 1, characterized in that the first and the second balancing means (30, 40) are each defined by at least one of the elements defined by a helical spring and a flexible arm disposed transversal to the displacement direction of the piston (2).

7. System, according to claim 1, characterized in that the balancing means (30, 40) are directly anchored to the shell (1).

* * * * *